United States Patent
Fischer et al.

(10) Patent No.: US 6,446,151 B1
(45) Date of Patent: Sep. 3, 2002

(54) PROGRAMMABLE TIME SLOT INTERFACE BUS ARBITER

(75) Inventors: Frederick Harrison Fischer, Macungie; Avinash Velingker, Orefield; Kenneth Daniel Fitch; Ho Trong Nguyen, both of Allentown, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/407,856

(22) Filed: Sep. 29, 1999

(51) Int. Cl.$^7$ ............................................. G06F 13/362
(52) U.S. Cl. ..................... 710/124; 710/120
(58) Field of Search .................. 710/124, 120, 710/123, 117, 116, 242, 243

(56) References Cited

U.S. PATENT DOCUMENTS

| | | | |
|---|---|---|---|
| 4,481,572 A | * 11/1984 | Ochsner ..................... | 710/117 |
| 4,888,765 A | * 12/1989 | Dyke ..................... | 340/825.51 |
| 5,539,902 A | * 7/1996 | Sakai et al. ................ | 710/117 |
| 5,598,542 A | * 1/1997 | Leung ...................... | 710/117 |
| 5,623,672 A | * 4/1997 | Popat ....................... | 710/100 |
| 5,648,962 A | * 7/1997 | Pirinen .................... | 370/336 |
| 5,805,836 A | * 9/1998 | Barnhart et al. ........... | 710/107 |
| 6,157,978 A | * 12/2000 | Ng et al. ................... | 710/117 |
| 6,275,888 B1 | * 8/2001 | Porterfield ................ | 710/100 |

* cited by examiner

Primary Examiner—Paul R. Myers
(74) Attorney, Agent, or Firm—William H. Bollman

(57) ABSTRACT

A method and apparatus allowing two independent arbiters which do not directly talk to one another to function on a common system bus, allowing efficient operation of a master controller, and virtually endless capability to add peripherals to the common system bus without problems or major modifications commonly associated with additional arbitration overhead. A master controller sets time slot parameters for an external, subordinate arbiter as often as desired. Based on the time slot parameter information, the subordinate arbiter functions on an electrically separated portion of the common system bus during all times but for a time slot associated with communication of the super arbiter over the entire common system bus. During this time, a tri-state buffer element allows communication between portions of the common system bus. In an adaptive arbitration mode, the subordinate arbiter combines static time slot information assigned in configuration registers together with actual bus requests to generate grant signals to the requesting devices, and reassigns all or portions of time slots which, although assigned to a particular device, are left unused for the relevant system cycle. A historical buffer may be maintained for any or all time slots. Using this historical information, long term statistical information may be generated. Moreover, the master controller may re-tune time slot configurations based on the historical information regarding past recent use of the relevant time slots.

20 Claims, 5 Drawing Sheets

SYSTEM VIEW OF "PLATFORM CHIP" AND EXTERNAL DEVICES

PROGRAMMABLE TIME SLOT INTERFACE BUS ARBITER

BACKGROUND OF THE INVENTION

1. Field of the Invention

This invention relates generally to time division multiplexed (TDM) digital systems. More particularly, it relates to arbitration methods and apparatus in an extended digital system.

2. Background of Related Art

Numerous digital devices are utilized by consumers throughout the world. In each of these devices, digital samples are passed between individual components, often using time division multiplexed (TDM) techniques over serial and/or parallel busses between the components. Arbitration for use of a system bus for passing these digital samples is typically controlled by an arbiter responsible for the system bus.

A TDM data stream typically comprises a repeating data cycle or frame, with each data frame being divided into a plurality of time slots. The data frame repeats over and over, but typically with new data samples in relevant time slots for each new cycle or frame of data. The data frames are conventionally synchronized with a frame synchronization signal or similar signal.

In a more general sense, time slots can relate to the time-shared usage of a system bus, e.g., a 32 bit parallel system bus. During an assigned time slot, a particular device can make exclusive use of the system bus up to the length of time allowed by a pre-determined configuration.

Time slots may be of any particular length, and separate time slots in a particular data frame may have different lengths.

Depending upon the needs of a particular application, conventional input and output channels of TDM system buses typically have fixed locations within a data frame assigned by a master controller or processor in the system.

A significant amount of flexibility can be provided using a time slot which may be used by any of a plurality of devices. For instance, if one particular device on a system bus requires a significant amount of time (and thus a long time slot) to perform a particular activity, then it would conventionally request bus access from the master controller. The conventional master controller assigns use of the TDM system bus in accordance with a given set of arbitration rules, e.g., a round-robin allocation, or an interrupt driven access request resulting in a first come, first served allocation.

The more flexibility in the use of a TDM system bus, the wider the market applications. In conventional systems, the designer typically implements this flexibility within the program code of the master controller of the system. In such systems, the master controller or processor allows access to a TDM system bus in accordance with its established arbitration rules. Flexibility is provided in such conventional devices by allowing the controller to change the length of access for any particular requesting device as desired.

Conventional system bus arbitration requires substantial resources or overhead of the master controller, which only increase as the complications of the system become greater. This is particularly true in multiple processor based systems, where communication data traffic between the processors increases as requests for access to the arbitrated system bus increase. Moreover, as the size of systems increases and as the number of agents on a particular system bus grows, the arbitration processing becomes enormous. This increased overhead results in a decreased amount of processing available for other tasks.

Conventional system arbiters exist, but are typically a priority-based super arbiter inside a super core or microcontroller.

There is thus a need for a more flexible arbitration architecture allowing use of a TDM system bus without requiring the significant overhead otherwise conventionally required in a master controller.

SUMMARY OF THE INVENTION

In accordance with the principles of the present invention, apparatus for arbitrating access to a time division multiplexed system bus comprises a super arbiter in communication with a common system bus. A subordinate arbiter is in communication with the common system bus. A first set of configuration registers for the subordinate arbiter define parameters relating to access time slots for each of a plurality of agents arbitrated by the subordinate arbiter. The first set of configuration registers are set by a controller associated with the super arbiter during a super time slot wherein the super arbiter arbitrates access by all devices on a common system bus, and take effect during other time slots wherein the common system bus is electrically separated between the super arbiter and the subordinate arbiter.

A system bus arbiter in accordance with another aspect of the present invention comprises a control portion to assign time slot access to each of a plurality of devices using an arbitrated system bus. A first set of configuration registers provide arbitration parameters to the control portion relating to each of the plurality of devices. A second set of configuration registers provide arbitration parameters to the control portion relating to each of the plurality of devices. The second set of configuration registers are substantially the same as the first set of configuration registers. Only one of the first set of configuration registers and the second set of configuration registers control parameters of the control portion at any one time. The other of the first set of configuration registers and the second set of configuration registers are accessible for updating.

A method of programming a subordinate arbiter from a controller associated with a super arbiter in accordance with yet another aspect of the present invention comprises arbitrating an entire common system bus between the super arbiter and the subordinate arbiter by the super arbiter only. Arbitration parameters of the subordinate arbiter are configured from the controller associated with the super arbiter. A first portion of the common system bus including the controller and the super arbiter is electrically isolated from a second portion of the common system bus including the subordinate arbiter.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
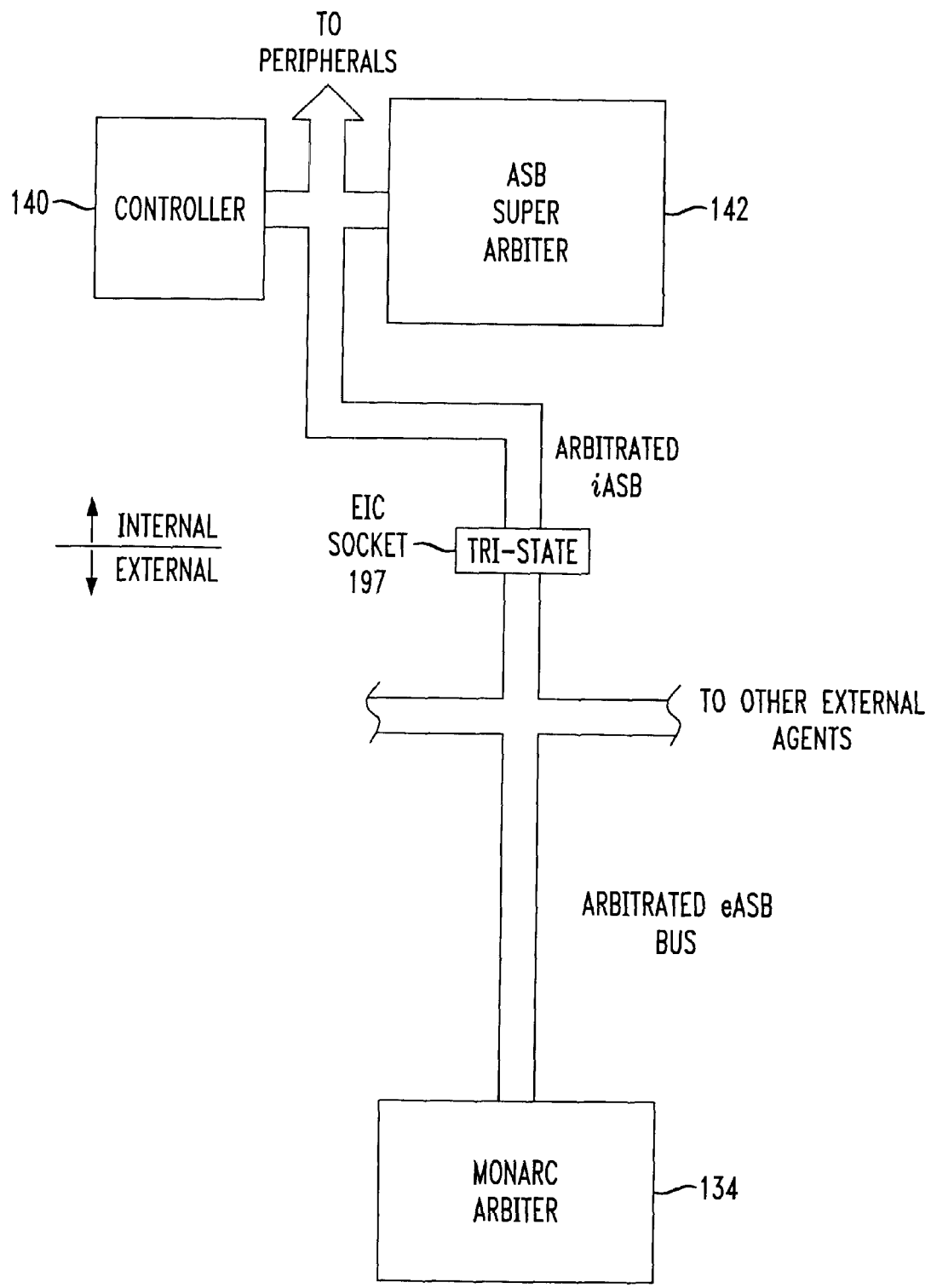
FIG. 1 shows the use of two distinct arbiters on a common bus, wherein the bus is separable using, e.g., a tri-state buffer device, under the control of a super controller associated with a super arbiter, in accordance with the principles of the present invention.

The present invention provides a programmable time slot interface (PTSI) bus arbiter and monitor separate from a super arbiter associated with a controller of a typical system. The PTSI arbiter offloads arbitration overhead from a controller system, particularly as the number of devices on the system bus grows, and provides a programmable alternative to existing methods such as fixed round-robin or interrupt priority based allocation.

In conventional digital systems which arbitrate from a single arbiter for use of time slots, the main controller typically handles arbitration and bus allocation tasks. In the preferred embodiment, a separate arbiter (i.e., the PTSI arbiter and bus monitor) is connected outside or external to a main controller (e.g., microcontroller, microprocessor or digital signal processor (DSP)), and thus removes the burden of arbitration and bus management, therefore freeing up valuable processing power of the main controller. Aspects relating to the use of two arbiters are disclosed in the present invention, as are adaptive methods and apparatus relating to the use of a history buffer to adaptively adjust the assignment of time slots by an arbiter.

The Programmable Time Slot Interface (PTSI) bus arbitration scheme has particular application with multiple processor systems, and in particular with "platform" system-on-a-chip devices that incorporate multiple bus masters and a shared communication bus. These "platform" chips are typically intended to serve multiple market applications. Consequently, they need to be flexible and extendable. In such devices, the ability to add or delete IP blocks capable of bus mastering is important, which becomes further complicated by the need to divide the shared bus bandwidth to accommodate system performance requirements.

The use of two (or more) arbiters on a common system bus is also particularly attractive for systems that consist of a mixture of cached controllers/processors, bus master-capable peripherals (DMA and external network interfaces), and/or slave peripherals (memory, timers).

In accordance with the principles of the present invention, a second arbiter (i.e., the PTSI arbiter) provides an on-chip bus arbitration system separate from the controller or controllers in the system. The system may be a single chip, or may be a plurality of integrated circuits on a printed circuit board (PCB). The PTSI arbiter programmably allocates time-slots for a shared TDM parallel bus among multiple bus masters (e.g., processors or agents).

If a particular agent does not currently require control of an allocated time slot, the PTSI arbiter is capable of adaptively re-allocating the relevant time slot for use by another bus master. This makes the shared bus usage adaptive to the data flow needs of the system in real time. This also allows for external bus mastering devices (i.e. co-processors) to share an external memory interface with internal agents.

The PTSI arbiter includes multiple PTSI configuration register sets (e.g., registers A & B) to allow the allocation of available time slots to be changed "in-situ".

Preferably, bus cycle hierarchy can be used to create a system cycle from which statistics can be gathered and dynamic configuration register set swapping can be accomplished.

FIG. 1 shows the use of two distinct arbiters on a common bus, wherein the bus is separable using, e.g., a tri-state buffer device, under the control of the PTSI arbiter, in accordance with the principles of the present invention.

Two arbiters do not necessarily communicate with one another. For instance, the described monarc arbiter "jams" the tri-state buffer to electrically separate the two portions of the split system bus, e.g., eASB from the iASB. Then, if the ARM needs access to the eASB memory space, it will attempt that access but get an error condition, and act on that error condition by activating an interrupt service routine. The interrupt service routine will request that the monarc arbiter freeze its state and "un-jam" the tri-state buffer. This can be referred to as "pre-emption".

In particular, in FIG. 1, a super arbiter 142 is associated with a system bus of a controller 140. The controller and its system bus (referred to as, e.g., the internal iASB bus) may have associated peripherals. The present invention includes a tri-state mechanism 197 connected to the system bus of the controller 140. In the disclosed embodiment, the tri-state mechanism is associated with an external socket (EIC Socket) into which an external bus may be connected.

A second arbiter (the MONitor ARbiter Circuit MONARC) 134 is connected to an added or second portion of the common system bus, referred to as an external eASB bus. The MONARC may have a plurality of devices or agents connected to the eASB, for which the MONARC has arbitration responsibility. Other busses and communication paths exist between the arbiters and peripherals (as will be shown in FIG. 5), but which are not shown in FIG. 1 for simplicity of explanation.

Figure 2:
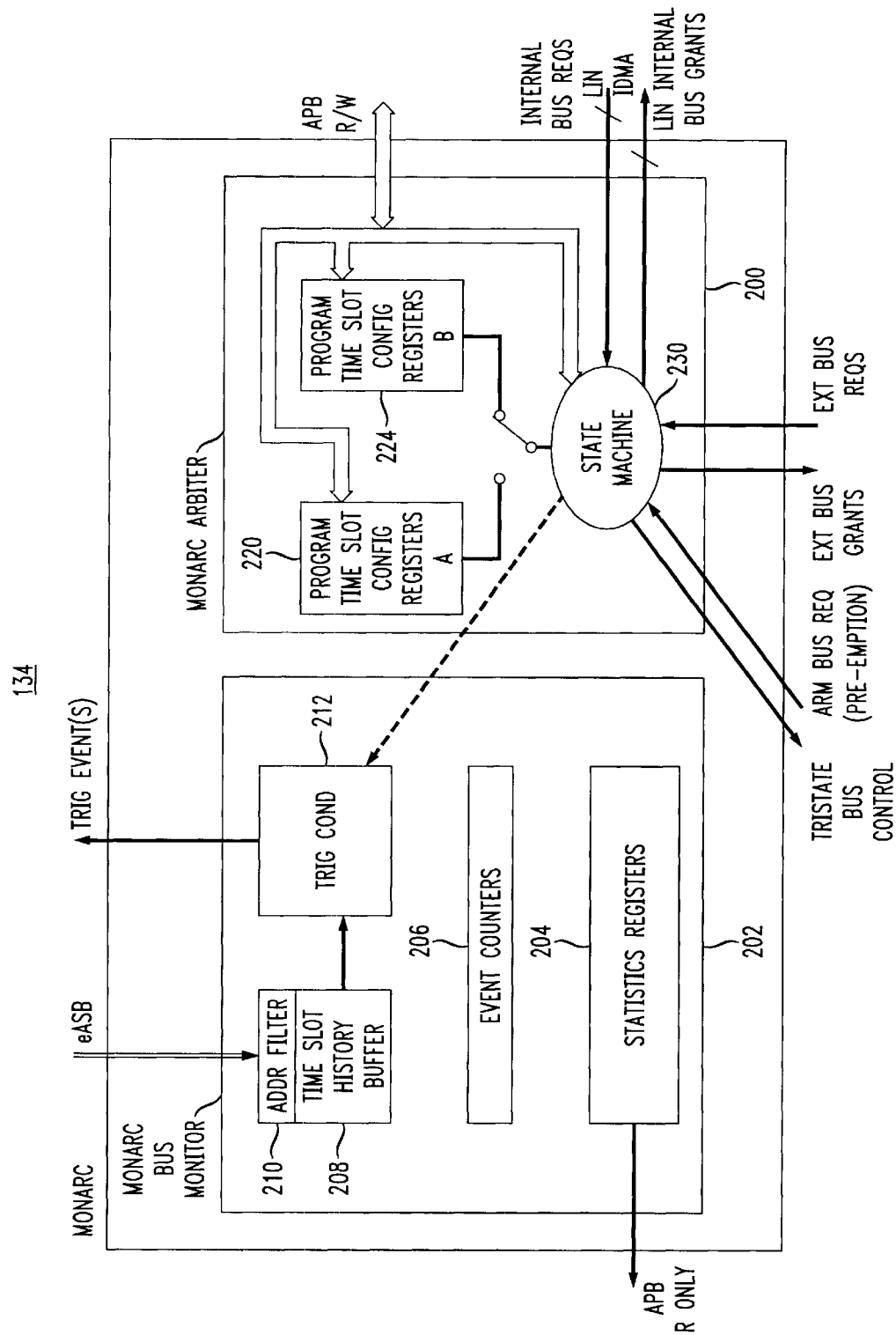
FIG. 2 is a more detailed block diagram of a monitoring arbiter circuit (MONARC) responsible for arbitration on its portion of the bus except during a special time slot wherein the tri-state buffer connects the two portions of the bus and returns arbitration control back to the super arbiter, in accordance with the principles of the present invention.

FIG. 2 is a more detailed block diagram of a monitoring arbiter circuit (MONARC) responsible for arbitration on its portion of the bus except during a special time slot wherein the tri-state buffer connects the two portions of the bus and provides arbitration control back to the super arbiter, in accordance with the principles of the present invention.

In particular, in FIG. 2, the MONARC arbiter 134 includes two main sub-blocks: the eASB arbiter 200 and the eASB bus monitor 202.

The eASB arbiter 200 accepts bus request inputs from its serviced peripherals, and also arbitration parameters stored in the configuration registers (which drive counters), and grants ownership of the eASB accordingly.

The eASB bus monitor 202 snoops transactions on the eASB bus and collects historical information and/or bus usage statistics which can be used by the controller 140 to adaptively re-tune the arbitration parameters of the added MONARC arbiter 134. Changes to the arbitration parameters of the MONARC arbiter 134 are allowed when the tri-stated portions of the system bus are re-connected during a special time slot allowing the super arbiter 142 arbitration control of the entire common system bus (i.e., the iASB and eASB).

The master controller 140 (e.g., an ARM940T) is tightly coupled with the MONARC arbiter 134 in this implementation wherein the controller supercore includes an internal super arbiter 142 which is dovetailed with the programmable time slot nature of the MONARC arbiter 134. The arbitration configuration registers of the MONARC can be accessed by the controller 140 through a separate bus communicationn mechanism, e.g., through an APB interface available in the ARM940T device.

The eASB bus monitor 202 is adjunct to the eASB arbiter 200 as shown in FIG. 2. The eASB bus monitor 202 may include a time slot history buffer 208.

The time slot history buffer 208 stores information regarding past bus transactions for some or all time slots. For instance, information regarding the last three, or the last ten transactions can be saved in the time slot history buffer 208. Thus, using information obtained by the eASB bus monitor 202 and obtained by the time slot history buffer 208, an additional set of registers may be included to compile statistics on shared bus usage for one, some or all time slots.

In particular, the disclosed time slot history buffer 208 is a set of registers capable of storing the address, data, control signals and aribter status regarding past eASB transactions, e.g., is selectable based on a maximum hardware buffer that is designed into the device. This historical information can be used to generate a trigger signal for a peripheral device (either connected to the eASB, the iASB, or external to the entire system) based on eASB bus activity.

The time slot history buffer 208 may also contain registers relating to statistics obtained by the MONARC arbiter 134 over many (e.g., millions) of system cycles. This info can be used by the controller 140 (or system user) to optimize the arbitration and time slot parameters used to control the MONARC arbiter 134.

In the disclosed embodiment, the monarc arbiter 134 includes a redundant set of time slot configuration registers. The redundant sets (A & B) of time slot configuration registers allows one set of registers to be used by the MONARC arbiter 134 while the other set is being written to by the controller 140. Thus, e.g., a new set of time slot parameters can be written into configuration register set B 224, while the MONARC arbiter 134 is functioning based on parameters previously stored in configuration register set A 220. A hardware interlock device may be provided to prevent access to the active configuration register set. In an alternative embodiment, a double buffering scheme can be used to allow one set to be written and pre-loaded while the prevoius values are used.

Historical information may be used in an adaptive fashion by the master controller 140 of the system to improve system performance and perhaps power consumption. The history buffer is also useful for system debugging. In this case, the user can take advantage of the resident controller 140 to process the statistical/historical information obtained by the monarc arbiter 134 to modify the PTSI arbitration or other system parameters relating to the arbitration rules used by the monarc arbiter 134 (such as clock enables or memory allocation) to improve performance.

Triggering conditions can be added to the time slot history buffer 208 to allow an internal eASB bus transaction to set external event flags (or Bit I/O signals) to be used by an external device.

A programmable address filter 210 may optionally be used at the front end of the time slot history buffer 208 between the eASB bus and the time slot history buffer 208, to allow the ability to restrict the address range of captured bus transactions.

In the disclosed embodiment, the user can program the configuration registers for the monarc arbiter 134. This is done in the disclosed embodiment with an alternating pair comprising of a first configuration register set (e.g., Register Set A) and a second configuration register set (e.g., Register Set B). While one of the register sets is in use, the other may be accessed by the master controller or other system device to adjust the time slots for accessing a relevant TDM system bus in the system. Thus, first the inactive set of registers is programmed, and then the active set of registers is switched by command from the controller 140. Reprogramming of arbitration parameters at least with respect to the eASB allows the user of the system to dynamically tune allocation of the eASB for better efficiency. Once one time slot configuration register set 220, 224 is swapped in or becomes active, the other configuration register set becomes available for modification and future use. In this way, the time slot parameters relating to arbitration on the eASB portion of the common system bus may be reconfigured as desired, as often as once per system cycle.

For instance, in the disclosed embodiment, the user is able to swap time slot configuration register sets 220, 224 at the end of any system bus cycle. Although capable of being reconfigured each system cycle, this ability to dynamically change the construction of the system bus and agent bus cycle is intended to be used after many system bus cycles (i.e., preferably not on a per system cycle basis—because of the added overhead).

A user can change the system bus cycle to match different real time processes in the overall system. The user can do this based on a priori knowledge of the software flow, or through a more adaptive process that uses some of the statistics compiled by the monitor.

Exemplary contents for the programmable time slot configuration register sets A & B 220, 224 are shown in Table 1. In Table 1, the PTSI System Parameters refer to exemplary higher level parameters that are used to construct the system cycle, and in Table 2 the PTSI Agent Time Slot Parameters refer to exemplary lower level parameters used to define the length of each time slot.

TABLE 1

| PTSI System Parameter | value |
| --- | --- |
| Mode# | |
| 0 = deterministic | |
| 1 = adaptive | |
| (request-based round robin) | |
| # agent time slots per system cycle | |
| (max 64) | |
| # of agents (max 32) | |
| Time Slot Sequence (agent IDs) | |
| # of unit cycles for MONARC management per system cycle | 8 |

In the deterministic mode, each time slot is automatically given and they last the max pre-programmed length. The time alloccated and the latency for the system cycle to return back to each agent time slot is pre-determined.

In the adaptive mode, a time slot is granted to an agent only if it is requested, and an agent can terminate the use of its allocated time cycle prior to the max time. In this case, the system cycle has an accordion like behavior which is dictated by the demands of the data flow through the data ports.

The number of agent time slots refers to the programmable number of time slots in each system cycle. Each agent of the eASB bus can be programmed to 0, 1 or more time slots within a given system cycle.

The number of agents refers to the number of dataports (i.e. universal serial bus (USB), Ethernet media access controller (MAC), peripheral components interface (PCI), high speed serial input/output (HSIO)) and other bus master capable devices that are attached to the eASB bus and governed by the MONARC arbiter.

The time slot sequence (agent IDs) refers to the programmable order in which the agent time slots occur.

The number of unit cycles per system refers to the lowest level bus clock cycle. Many unit cycles are selected to make up an agent time slot. Many agent time slots are selected to make up a system cycle.

Other register values, e.g., PTSI Agent time slot parameters, may be as shown in Table 2.

TABLE 2

| PTSI Agent Time Slot Parameter | value |
| --- | --- |
| # of unit cycles per agent time slot (min = 8; max = 64K) # of "completion" unit cycles required for each agent time slot | |

The number of completion unit cycles for each agent time slot refers to a certain number of unit cycles which can be programmed at the end of each agent cycle to allow for the agent to complete a bus transaction prior to giving up the bus because the arbiter is moving on to the next time slot.

The eASB bus monitor shown in FIG. 2 may further include statistics registers 204. The statistics gathered by the bus monitor are updated to the statistics registers 204, which are readable by the master controller 140. The statistics become valid at the end of every system bus cycle (in the MONARC update time slot). The statistics maintained in the statistics registers 204 can be reset or initialized at the end of every system bus cycle. Statistical information in conjunction with the time slot related parameters used in the configuration registers can be used to characterize the efficiency of the programmed PTSI values that were used for a given application.

Table 3 contains some exemplary statistics that can be maintained by the eASB bus monitor 202 in the statistics registers 204:

TABLE 3

| MONARC accumulated statistics |
| --- |
| # of system cycles # of bus requests per agent cycle slot # of times an agent cycle slot used the max allocated time period # of individual read or write bus transactions per agent cycle slot # of burst read or write transactions per agent cycle slot |

The principles of the present invention regarding arbitration and/or internal bus monitoring are applicable to many types of systems, particularly to "system-on-a-chip" devices that use a shared bus architecture. While described with respect to shared use of time slots in a TDM system bus system, the concept has applicability to many other types of applications.

Figure 3:
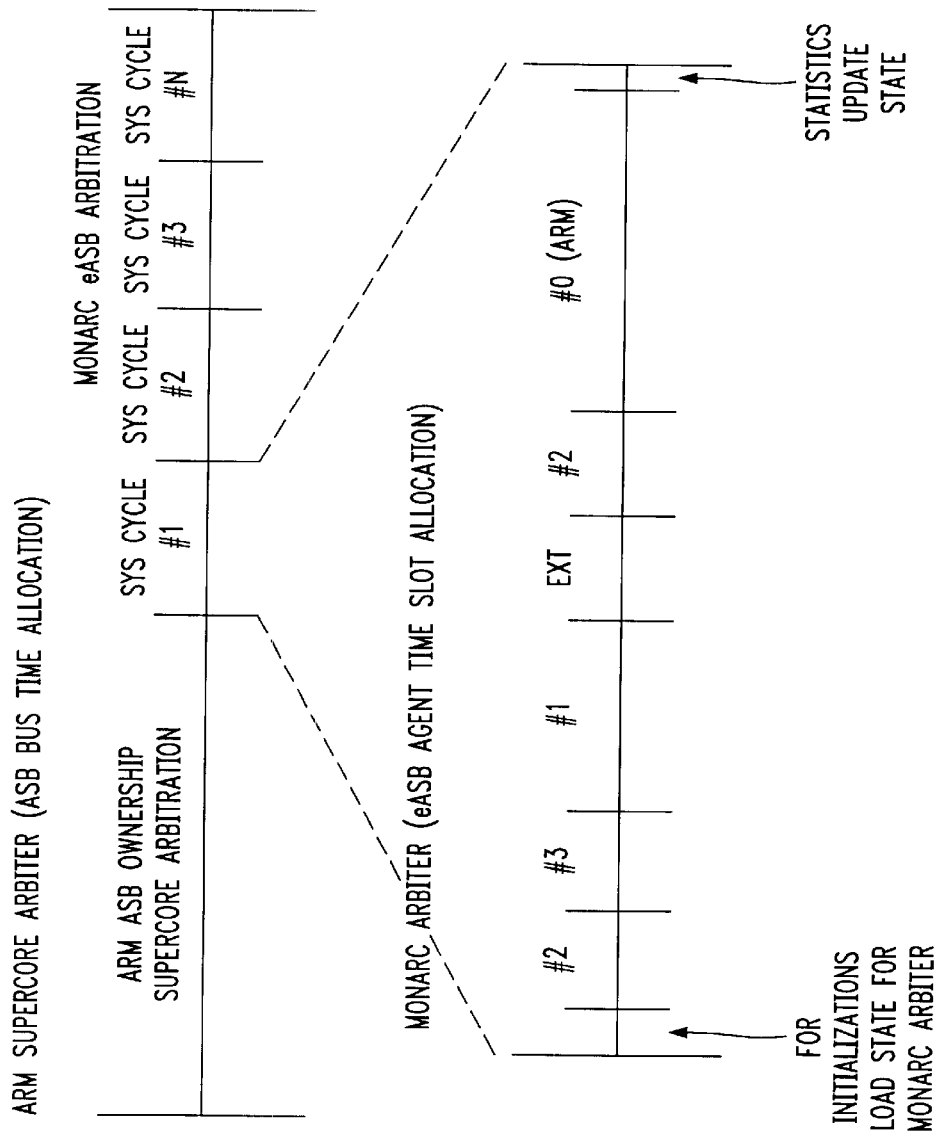
FIG. 3 is a timing diagram showing exemplary time slots in each of a series of system cycles using a programmable time slot interface (PTSI) bus arbitration concept based on the use of a hierarchical bus cycle definition, in accordance with the principles of the present invention.

FIG. 3 is a timing diagram showing exemplary time slots in each of a series of system cycles using the PTSI bus arbitration concept based on the use of a hierarchical bus cycle definition, in accordance with the principles of the present invention.

In particular, in FIG. 3, at the lowest level the bus is toggled at a unit cycle rate. The unit cycle rate may or may not be tied to the clock speed of one of the bus masters. It is the fastest speed at which the bus signals can be switched. Simulation and special layout considerations must be made to ensure that the loading, parasitics and noise characteristics can support the selected unit cycle rate.

The second level bus cycle is called the agent time slots. It is the time of bus ownership that is allocated to a given bus master. It is programmable and is based on a given number of unit cycles. As ownership is passed from one bus master agent to another, a protocol is established to ensure that the bus is not simultaneously driven by multiple masters.

At the top level, the PTSI has a system cycle rate. The system cycle is composed of a programmable number of agent cycles. The completion of a system cycle (or many system cycles) could be used to change the PTSI arbitration parameters stored in the time slot configuration registers 220, 224, and/or to compile/update bus usage statistics. The same agent can appear at many different times (with varying agent cycle lengths) of a system cycle.

The time slot configuration parameters set in the time slot configuration registers 220, 224 establish the state machine 230 which governs the control of bus ownership and defines the agent time slot and system cycle attributes. Upon reset, the system will be in an initialization state which is suitable for system setup (e.g., the master controller 140 will have ownership of a separate APB bus). The controller 140 uses this APB bus to set the parameters in the time slot configuration registers 220, 224.

During this initialization, the iASB and eASB bus requests are joined and the super arbiter has access to the entire memory mapped address space.

After the master controller 140 has setup the desired values into the time slot configuration registers 220, 224, it will set an enable bit which will allow the MONARC PTSI configuration to be invoked. From this point on, the selected set of PTSI values will be used and the designated agents will be given bus ownership in the programmed sequence. The inactive set of configuration registers (e.g., initially the "B set" 224) can be used to set up another PTSI configuration while the first PTSI configuration is running based on the values stored in the "A set" 220. The inactive set of configuration registers can be invoked at the end of any system cycle.

In the disclosed embodiment, two operational modes of the PTSI state machine 230 are set up.

For instance, the eASB arbiter 200 can be operated in either a deterministic mode (mode 0) or in an adaptive mode (mode 1).

Mode 0 is completely deterministic in the time domain. In this mode, each agent cycle lasts the entire programmed duration that is set forth in the active time slot configuration register 220 or 224. In this deterministic mode, each bus master will not only have bus ownership for a fixed amount of time, it will also have a fixed period of time between its bus ownership time slots, regardless of whether it needs to transfer data across the bus during that time slot.

On the other hand, mode 1 is an adaptive mode which allows round robin—allocation based on received bus request signals. The adaptive mode utilizes bus request input signals from the various agents and other peripherals on the eASB to determine if the next assigned bus master has a need to be allocated the upcoming agent cycle. If it does not, the state machine 230 will go through the programmed system cycle sequence to determine which bus master will be given bus ownership next.

Once an agent cycle has been assigned to a bus master or agent, it will have ownership until the bus master or agent has removed its bus request signal (before the agent cycle has ended) or for the entire time slot duration that was assigned to it by the configuration registers.

When an agent cycle is prematurely ended (by bus request removal), the state machine 230 will continue on with the PTSI programmed sequence.

Thus, the adaptive arbitration mode uses the programmed sequence of time slots and the programmed time slot duration as a maximum amount of time to assign bus ownership in an "as needed" basis, allowing reallocation and improved efficiency during otherwise unused portions of an assigned time slot.

In the adaptive arbitration mode, the duration of a system cycle varies based upon the demand for the eASB bus. In this mode, the agent time slot limits are setup to ensure that specific agents will be guaranteed a minimum piece of the eASB bandwidth.

Figure 4:
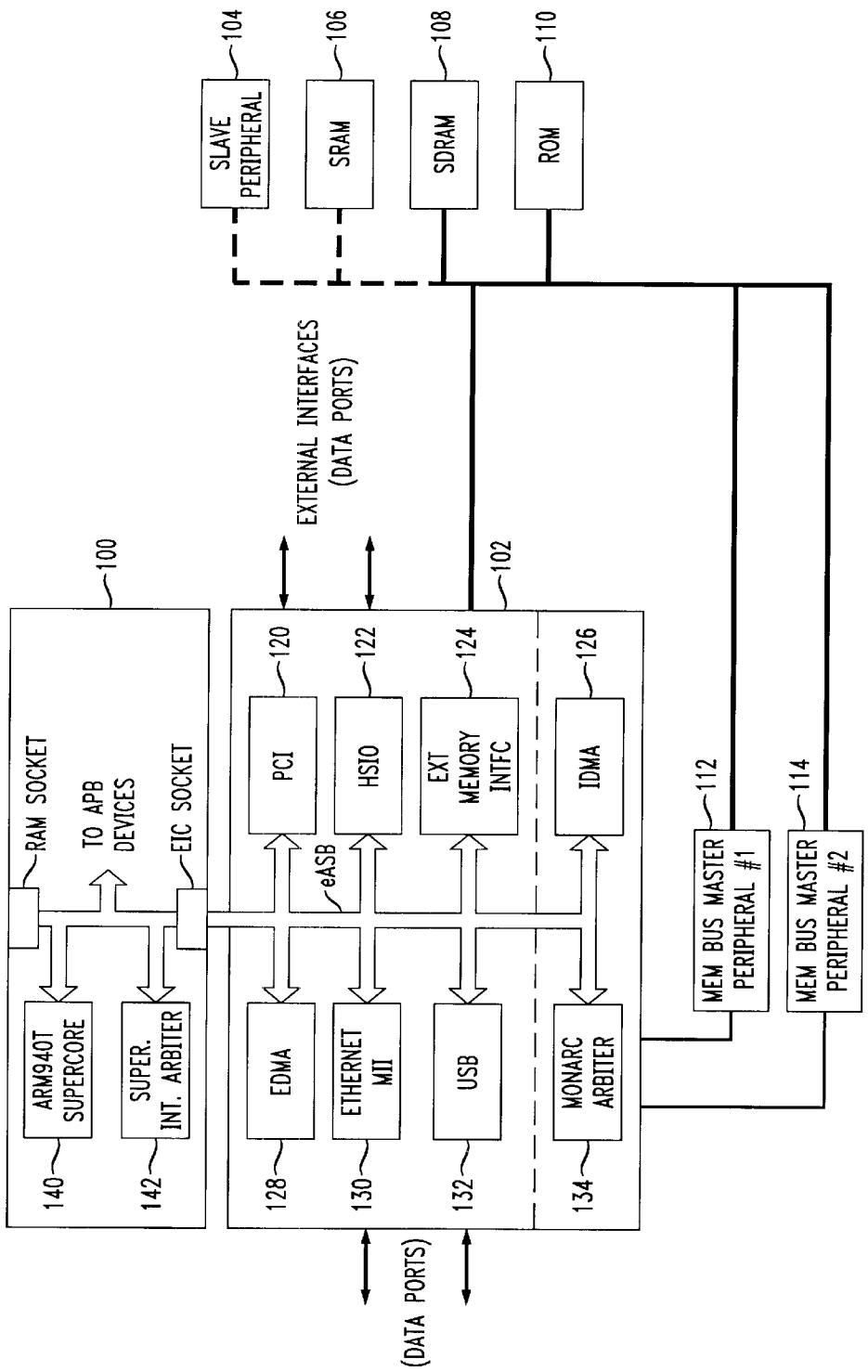
FIG. 4 is a block diagram of a platform circuit useful in many applications, including in the example application of a Asynchronous Digital Subscriber Loop (ADSL) capable device, in accordance with the principles of the present invention.
Figure 5:
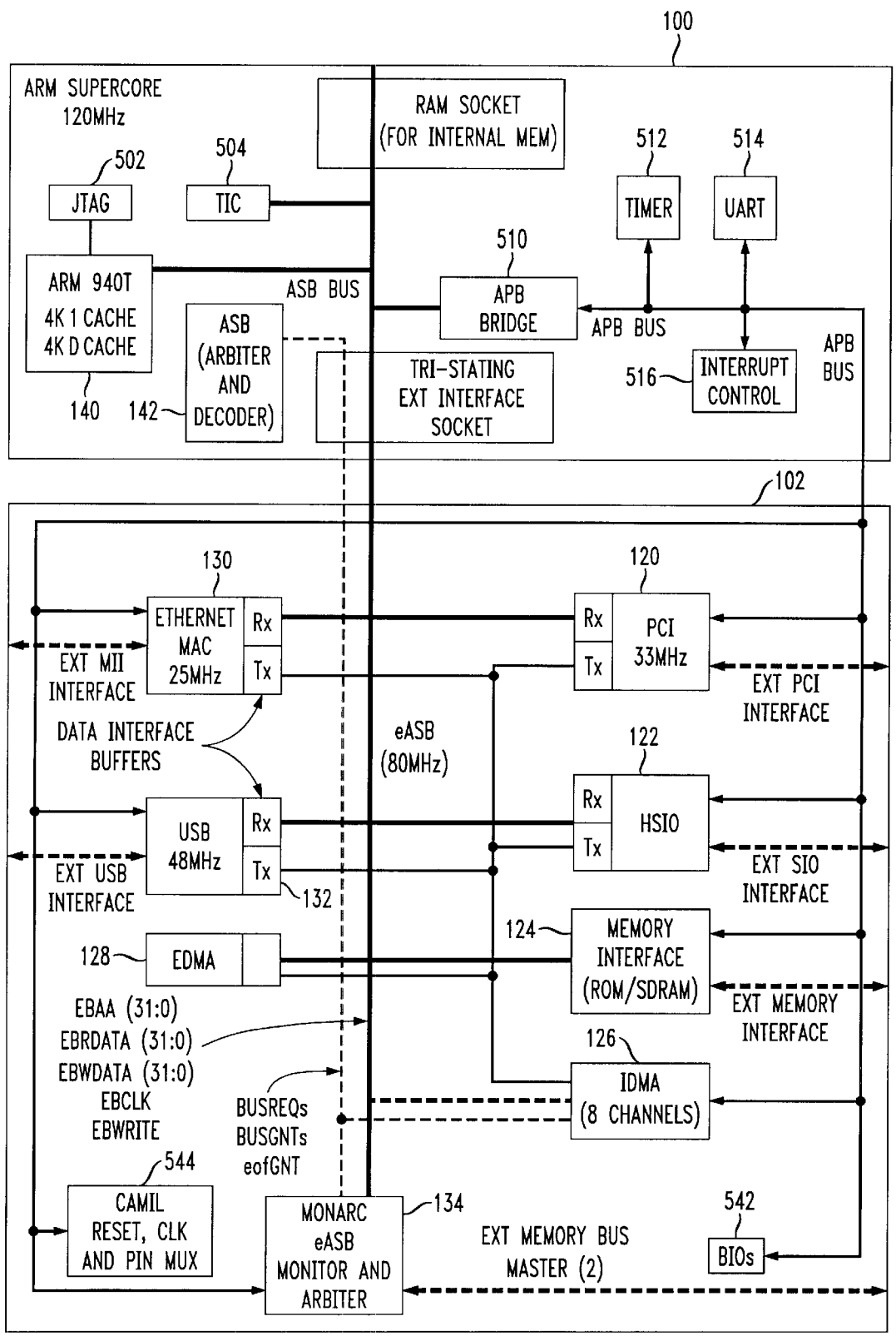
FIG. 5 is a more detailed block diagram of the platform circuit shown in FIG. 4.

The PTSI scheme in general and the MONARC arbiter 134 in particular can be further explained by describing their function within the context of a proposed chip architecture. To this end, FIG. 4 is a block diagram of a platform circuit useful in many applications, including in the example application of an ADSL capable device, in accordance with the principles of the present invention. FIG. 5 is a more detailed block diagram of the platform circuit shown in FIG. 4.

In FIGS. 4 and 5, the following definitions and explanations apply.

MONARC is an acronym that stands for Monitor Arbiter Circuit.

The master controller 140 can be any suitable processor or general purpose controller, e.g., a microprocessor, a microcontroller, or a digital signal processor (DSP). In the disclosed embodiment, the master controller 140 is an ARM940T controller, but can be any general purpose which is a 32 bit microcontroller from an English company called ARM. The ARM940T includes a 4 kbyte data cache and a 4 kbyte instruction cache. Of course, any suitable multipurpose microcontroller or other processor can be used.

The MONARC PTSI scheme refers to the process performed by the MONARC arbiter 134 for ownership of the eASB bus.

The ARM supercore is a superset of the ARM940T controller and its included functional blocks. In the disclosed embodiment shown in FIGS. 4 and 5, peripherals have been added (e.g., a programmable interrupt controller etc.) and sockets have been added to the bus of the ARM940T controller to form the supercore.

The External Interface Circuit (EIC) includes the tri-state function to separate the common system bus into a first portion associated with the ARM controller 140 and the super arbiter 142, and a second portion associated with the added MONARC arbiter 134 and associated peripherals for which it has arbitration responsibility. Thus, the EIC includes a tri-state buffer to electrically separate the existing ASB bus of the ARM controller 140 from the portion of the bus relating to the added circuitry, creating a split bus comprising a first portion of the common system bus, i.e., internal to the supercore (iASB), and a second portion of the common system bus, i.e., external to the supercore (eASB). The external interface circuit allows blocks outside of the ARM supercore to be added to the iASB bus of the ARM controller 140.

When the supercore iASB bus is connected to the eASB, the ARM supercore effectively has direct accessibility to its entire memory map space (i.e., to peripherals connected to both portions iASB, eASB of the common system bus).

The ARM supercore 140 generates two busses which use the AMBA bus protocol from the ARM. The APB is the ARM Peripheral Bus, which is intended to be used with slower peripherals. The ASB is the ARM high speed bus that is intended to be used for high speed peripherals. The APB bus is used to read & write status/configuration registers in all of the peripheral blocks. It provides a "slow backdoor" access for the eASB agents. It is also used to directly interface to some of the slower peripherals. The APB bus is generated by the APB bridge which hangs off of the IASB.

The Internal Direct Memory Access (IDMA) 126 refers to a sub-block connected to each of the eASB data ports. This sub-block allows the dataport First-In, First-out (FIFO) devices (also referred to as DIBs) to buffers incoming & outgoing data to transfer the buffered data to/from external memory.

The super arbiter 142 is inside the supercore. The super arbiter 142 is a priority based arbiter. The super arbiter 142 is in control of the entire common system bus upon reset, the subordinate MONARC arbiter 134 being inactivated at this time. The ARM controller 140 may configure the time slot parameters in one (or both upon initialization) of the configuration register sets 220, 224. After the MONARC is programmed & enabled, the MONARC arbiter 134 can co-exist with the super arbiter 142 with appropriate electrical separation provided by the tri-state buffers 197. The common system bus becomes electrically re-connected when the MONARC arbiter 134 grants the ARM supercore 140 a time slot on the eASB bus.

Although the MONARC arbiter time slots are programmable in general, the ARM 140 (e.g., agent #0) preferably has at least one pre-allocated time slot in the time slot sequence that defines the system cycle.

In FIGS. 4 and 5, the external, or added bus (eASB) is setup for high speed data traffic between a given agent and the external shared memory. Each of these agents (with the exception of the ARM controller 140) has a read and write data buffer and associated status signals which are inputs to the IDMA 126. The IDMA 126 is attached to the MONARC arbiter 134.

The disclosed system has two levels of ASB bus arbitration hierarchy. The supercore arbiter 142 is the top level of arbitration. It can be configured to allocate the ASB ownership to the EIC socket (i.e. eASB peripherals). After system initialization (when ARM owns the entire ASB bus (both iASB and eASB)), the ARM 140 enables the MONARC arbiter 134 and the supercore arbiter 142 relinquishes control of the extended portion eASB of the common system bus to the eASB arbiter 200 upon system bus tri-state separation. At this point in time, the ARM 140 becomes one of the agents on the eASB bus.

The ARM 140 is preferably the only agent that can disable the MONARC arbiter 134, and is labeled agent #0 in the disclosed embodiment. The ARM 140 also has a preemption capability which allows it to (in effect) extend its eASB time slot by disabling and suspending the arbitration by the MONARC arbiter 134. When the ARM 140 is finished, it can re-enable the MONARC arbiter 134, and the system arbitration cycle will continue where it left off.

In an emergency situation on the eASB bus, the MONARC arbiter 134 can be disabled, and the ARM 140 can be given responsibility to determine when to re-enable the MONARC arbiter 134 and again relinquish control of the eASB bus.

The MONARC arbiter 134 distributes ownership of the eASB bus among the internal interface devices and two external bus master capable peripherals. In the case of external bus masters, they are really not provided access to the eASB bus, but rather are granted access (with no contention) to the external memory bus. Thus, the MONARC arbiter 134 maintains all of the internal agents off of the eASB bus so that the external device can use the external memory interface.

While the invention has been described with reference to the exemplary embodiments thereof, those skilled in the art will be able to make various modifications to the described embodiments of the invention without departing from the true spirit and scope of the invention.

What is claimed is:

1. Apparatus for arbitrating access to a time division multiplexed system bus, comprising:
    a super arbiter in communication with a common system bus;
    a subordinate arbiter in communication with said common system bus;
    a first set of configuration registers for said subordinate arbiter to define parameters relating to access time slots for each of a plurality of agents arbitrated by said subordinate arbiter;
    wherein said first set of configuration registers are set by a controller associated with said super arbiter during a super time slot wherein said super arbiter arbitrates access by all devices on a common system bus, and take effect during other time slots wherein said common system bus is electrically separated between said super arbiter and said subordinate arbiter.

2. The apparatus for arbitrating access to a time division multiplexed system bus according to claim 1, further comprising:
    a second set of configuration registers similar to said first set of configuration registers;
    wherein only one of said first set of configuration registers and said second set of configuration registers are impressed upon said subordinate arbiter at any one time.

3. The apparatus for arbitrating access to a time division multiplexed system bus according to claim 2, further comprising:
    a hardware interlock to allow said subordinate arbiter to be controlled by only one of said first set of configuration registers and said second set of configuration registers at any one time, the other of said first set of configuration registers and said second set of configuration registers being accessible for revision by a controller associated with said super arbiter.

4. The apparatus for arbitrating access to a time division multiplexed system bus according to claim 1, wherein said first set of configuration registers comprise:
    an adaptive mode setting allowing adaptive grant of time slots to a requesting device in communication with said common system bus only when requested by said requesting device; and
    a deterministic mode setting granting time slots to devices in communication with said common system bus in accordance with predetermined time slot information.

5. The apparatus for arbitrating access to a time division multiplexed system bus according to claim 1, wherein said first set of configuration registers comprise:
    a setting establishing a number of time slots to be granted in each system cycle.

6. The apparatus for arbitrating access to a time division multiplexed system bus according to claim 1, wherein said first set of configuration registers comprise:
    a setting establishing a number of agents to be arbitrated by said subordinate arbiter.

7. The apparatus for arbitrating access to a time division multiplexed system bus according to claim 6, wherein said first set of configuration registers further comprise:
    information regarding a programmable time slot ordering for said agents.

8. The apparatus for arbitrating access to a time division multiplexed system bus according to claim 1, wherein said first set of configuration registers comprise:
    information regarding a unit cycle number relating to a number of bus clock cycles per system cycle.

9. The apparatus for arbitrating access to a time division multiplexed system bus according to claim 1, wherein said first set of configuration registers comprise:
    information regarding a length of each time slot.

10. The apparatus for arbitrating access to a time division multiplexed system bus according to claim 1, wherein said first set of configuration registers comprise:
    an allowed number of completion bus clock cycles for a relevant agent to complete a transaction at an end of its granted time slot.

11. A method of programming a subordinate arbiter from a controller associated with a super arbiter, comprising:
    arbitrating an entire common system bus between said super arbiter and said subordinate arbiter by said super arbiter only;
    configuring arbitration parameters of said subordinate arbiter from said controller associated with said super arbiter; and
    electrically isolating a first portion of said common system bus including said controller and said super arbiter from a second portion of said common system bus including said subordinate arbiter.

12. The method of programming a subordinate arbiter from a controller associated with a super arbiter according to claim 11, further comprising:
    electrically connecting said first portion of said common system bus with said second portion of said common system bus during a time slot assigned by said subordinate arbiter; and
    while electrically connected, allowing said super arbiter to arbitrate access to both said first portion of said common system bus and said second portion of said common system bus.

13. Apparatus for programming a subordinate arbiter from a controller associated with a super arbiter, comprising:
    means for arbitrating an entire common system bus between said super arbiter and said subordinate arbiter by said super arbiter only;

means for configuring arbitration parameters of said subordinate arbiter from said controller associated with said super arbiter; and means for electrically isolating a first portion of said common system bus including said controller and said super arbiter from a second portion of said common system bus including said subordinate arbiter.

14. The apparatus for programming a subordinate arbiter from a controller associated with a super arbiter according to claim 13, further comprising:

means for electrically connecting said first portion of said common system bus with said second portion of said common system bus during a time slot assigned by said subordinate arbiter; and means for allowing said super arbiter to arbitrate access to both said first portion of said common system bus and said second portion of said common system bus while electrically connected.

15. A system bus arbiter, comprising:

a control portion to assign time slot access to each of a plurality of devices using an arbitrated system bus;

a first set of configuration registers providing arbitration parameters to said control portion relating to each of said plurality of devices; and a second set of configuration registers providing arbitration parameters to said control portion relating to each of said plurality of devices, said second set of configuration registers being substantially the same as said first set of configuration registers;

wherein only one of said first set of configuration registers and said second set of configuration registers control parameters of said control portion at any one time, the other of said first set of configuration registers and said second set of configuration registers being accessible for updating.

16. The system bus arbiter according to claim 15, wherein said arbitration parameters include:

an adaptive mode based on bus access requests received from said plurality of devices.

17. The system bus arbiter according to claim 16, wherein said arbitration parameters further include:

a deterministic mode based on time slot configurations for each of said plurality of devices established by said arbitration parameters.

18. The system bus arbiter according to claim 16, wherein:

said adaptive mode is further based on time slot configurations for each of said plurality of devices established by said arbitration parameters.

19. A bus arbitrated system, comprising:

a system bus divided into time slots;

a plurality of asynchronous data ports in communication with said system bus; and an arbitrator for said system bus allowing said asynchronous data ports to share said system bus using said time slots.

20. The bus arbitrated system according to claim 19, wherein:

said system bus includes a first bus portion electrically isolatable from a second bus portion;

said first bus portion is in direct communication with at least one of said plurality of asynchronous data ports; and said second bus portion is in direct communication with the remainder of said plurality of asynchronous data ports.

* * * * *